United States Patent
Lin et al.

(10) Patent No.: US 9,436,793 B2
(45) Date of Patent: Sep. 6, 2016

(54) TIER BASED LAYER PROMOTION AND DEMOTION

(71) Applicant: Taiwan Semiconductor Manufacturing Company Limited, Hsin-Chu (TW)

(72) Inventors: Yen-Hung Lin, Hsinchu (TW); Chi Wei Hu, Pingzhen (TW); Yuan-Te Hou, Hsinchu (TW); Chung-Hsing Wang, Boashan Township (TW); Chin-Chou Liu, Jhubei (TW)

(73) Assignee: Taiwan Semiconductor Manufacturing Company Limited, Hsin-Chu (TW)

( * ) Notice: Subject to any disclaimer, the term of this patent is extended or adjusted under 35 U.S.C. 154(b) by 178 days.

(21) Appl. No.: 14/166,974

(22) Filed: Jan. 29, 2014

(65) Prior Publication Data
US 2015/0213178 A1 Jul. 30, 2015

(51) Int. Cl.
*G06F 17/50* (2006.01)

(52) U.S. Cl.
CPC ....... *G06F 17/5081* (2013.01); *G06F 17/5077* (2013.01); *G06F 2217/84* (2013.01)

(58) Field of Classification Search
USPC ........................................................ 716/123
See application file for complete search history.

(56) References Cited

U.S. PATENT DOCUMENTS

| | | | | |
|---|---|---|---|---|
| 2007/0240089 A1* | 10/2007 | Tanaka | ................ | G06F 17/5081 716/53 |
| 2008/0010624 A1* | 1/2008 | Lin | ...................... | G06F 17/5068 716/122 |
| 2009/0187871 A1* | 7/2009 | Cork | ......................... | G03F 1/36 716/119 |
| 2009/0290401 A1* | 11/2009 | Ouyang et al. | .......... | G11C 5/02 365/51 |
| 2011/0107281 A1* | 5/2011 | Sun | ...................... | G06F 17/5081 716/106 |
| 2013/0283225 A1* | 10/2013 | Alpert | ................. | G06F 17/5072 716/122 |

* cited by examiner

*Primary Examiner* — Mohammed Alam
(74) *Attorney, Agent, or Firm* — Cooper Legal Group, LLC (57) ABSTRACT

Among other things, one or more systems and techniques for tier based layer modification, such as promotion or demotion, for a design layout are provided herein. A metal scheme describes one or more metal layers of the design layout, which are grouped into a set of tiers based upon resistivity similarity between the metal layers. Wire segments of the design layout are evaluated for promotion to tiers providing improved performance, for demotion to tiers providing decreased performance so that relatively faster routing resources are freed up for other wire segments, or for modification such as widening of wire segments. Via count penalties corresponding to timing delays of additional vias used to reassign wire segments are taken into account during promotion. Routing resource gains associated with reassigning wire segments are taken into account during demotion. In this way, wire segments of the design layout are promoted, demoted, or modified.

20 Claims, 9 Drawing Sheets

TIER BASED LAYER PROMOTION AND DEMOTION

BACKGROUND

Electronic design tools allow designers to layout, simulate, and analyze electrical components, such as integrated circuits. In an example, a schematic designer creates a schematic diagram of an integrated circuit. The schematic diagram comprises symbols that represent components of the integrated circuit. However, the schematic diagram does not represent a physical layout of the integrated circuit. A layout designer creates a design layout, such as a physical layout, of the integrated circuit using the schematic diagram. The design layout comprises one or more polygons representing metal, silicon, or other components or portions thereof. A metal scheme describes one or more metal layers comprising wire segments of the design layout.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

One or more techniques and systems for tier based layer modification for a design layout are provided. A design layout for an integrated circuit comprises one or more layers, such as metal layers comprising wire segments used to route components of the integrated circuit. A metal scheme describes resistances, sizing properties, or other properties/constraints for the metal layers. In some embodiments, upper metal layers have relatively lower resistance routing resources that provide relatively higher performance, while lower metal layers have relatively higher resistance routing resources that provide relatively lower performance. Increased resistance and resistance variance between metal layers can impede power, performance, and area. Accordingly, as provided herein, wire segments, such as timing relevant segments, are reassigned, such as promoted, to promotion tiers that provide relatively faster performance. Promotion takes into account the metal scheme and takes into account delays introduced by additional vias used for reassignment of wire segments from current tiers to promotion tiers. Wire segments, such as non-timing relevant segments, are reassigned, such as demoted, from current tiers to demotion tiers that have decreased performance so that relatively faster routing resources of the current tiers are made available for timing relevant segments. Such promotion and demotion of wire segments increases performance of wire segments such as timing relevant segments while mitigate unnecessary vias, and frees up relatively faster routing resources for the timing relevant segments.

Figure 1:
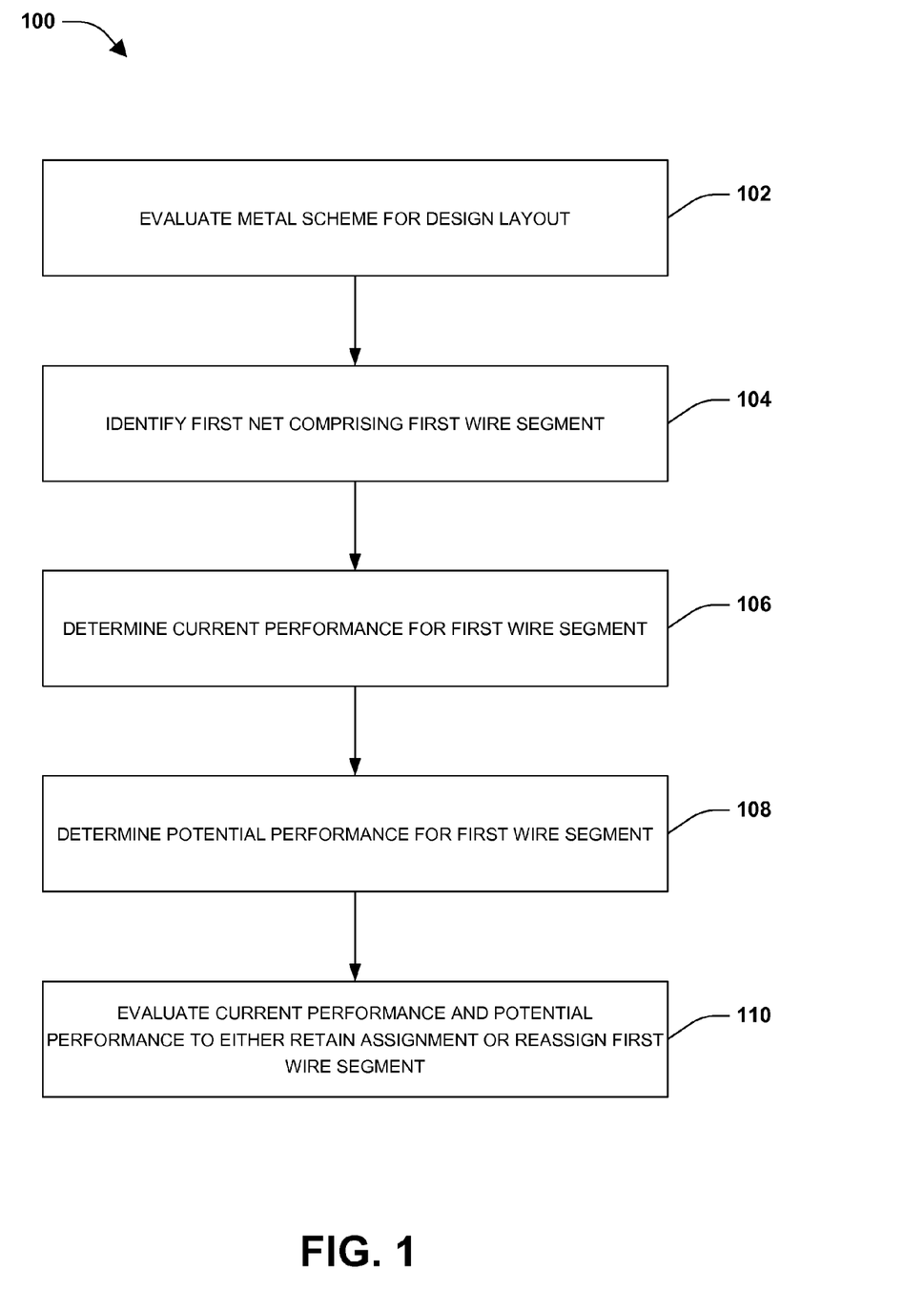
FIG. 1 is a flow diagram illustrating a method of tier based layer modification for a design layout, in accordance with some embodiments.

A method 100 of tier based layer modification for a design layout is illustrated in FIG. 1. A design layout for an integrated circuit or other circuitry comprises one or more layers, such as metal layers. A metal scheme describes the metals layers, such as sizing properties, resistances, or other properties/constraints of the metal layers. At 102, the metal scheme is evaluated to group metal layers of the design layout into a set of tiers. In an embodiment, a first metal layer, such as vertical wire segments having a width W, and a second metal layer, such as horizontal wire segments having the width W, are grouped into a tier based upon the first metal layer having a first resistance property corresponding to a second resistance property of the second metal layer. Because the first metal layer and the second metal layer have similar resistivity, performance of the first wire segment and the second wire segment are similar, and are thus grouped together into the tier. In some embodiments, a tier comprises a single layers or multiple layers.

The design layout comprises one or more components that are routed according to nets. A net comprises one or more component nodes connected by wire segments. At 104, a first net within the design layout is identified. The first net comprises one or more wire segments, such as a first wire segment. At 106, a current performance for the first wire segment is determined based upon a current tier, of the set of tiers, to which the first wire segment is assigned. In an embodiment, the set of tiers comprises a first tier having slow performance due to a high resistance of metal routing resources within the first tier, a second tier having medium performance due to a medium resistance of metal routing resources within the second tier, and a third tier having fast performance due to a low resistance of metal routing resources within the third tier. Responsive to identifying the first wire segment as being currently assigned to the second tier, the current performance for the first wire segment is determined as the medium performance.

At 108, a potential performance for the first wire segment is determined based upon a potential tier, of the set of tiers, to which the first wire segment could be reassigned. At 110, the current performance and the potential performance are evaluated to either retain the assignment of the first wire segment to the current tier or reassign the first wire segment to the potential tier. In some embodiments, the first wire segment, such as a timing relevant segment, is reassigned to a promotion tier having a relatively faster performance than the current tier based upon the reassignment resulting in a performance improvement notwithstanding delay introduced by additional via resources used to perform the reassignment. The reassignment is performed where the potential performance, corresponding to the performance increase from the promotion and a reduction to the performance increase by the delay from the additional via resources, is above an improvement threshold. In some embodiments, the first wire segment, such as a non-timing relevant segment, is reassigned to a demotion tier having relatively slower performance than the current tier based upon the reassignment resulting in a routing resource gain, corresponding to relatively faster resources within the current tier that are freed up from the reassignment, and a performance decrease that is within a performance decrease threshold for the first wire segment.

In some embodiments, the first wire segment is determined as comprising a timing relevant segment, such that the first wire segment would benefit from increased performance. The potential tier is identified as a promotion tier, such as the third tier having the fast performance, based upon the first wire segment comprising the timing relevant segment. A via count penalty associated with reassigning the first wire segment from the current tier to the potential tier is determine. In some embodiments, the via count penalty corresponds to a delay associated with using 3 additional vias to reroute the first wire segment from the second tier to the third tier. The potential performance is identified based upon reducing the fast performance of the third tier using the delay. If the potential performance, corresponding to the fast performance of the third tier reduced by the delay from the 3 additional vias, provides improved performance compared to the medium performance of the second tier as the current tier, then the first wire segment is reassigned, such as promoted, from the second tier to the third tier. Otherwise, the first wire segment is retained within the second tier. In some embodiments, responsive to retaining the assignment of the first wire segment to the current tier, a size parameter of the first wire segment is increased, such as an increase to a width of the first wire segment. In some embodiments, responsive to retaining the assignment of the first wire segment to the current tier, a buffer is inserted into the current tier with respect to the first wire segment.

In some embodiments, the first wire segment is determined as comprising a non-timing relevant segment, such that the first wire segment is evaluated to determine whether reassignment, such as demotion, of the first wire segment to a relatively slower tier is advantageous to free up relatively faster routing resources of the current tier. The potential tier is identified as a demotion tier, such as the first tier having the slow performance, based upon the first wire segment comprising the non-timing relevant segment. A routing resource gain associated with reassigning the first wire segment from the current tier to the potential tier is determined. In some embodiments, the routing resource gain corresponds to an amount of medium performance routing resources within the second tier that are freed up from reassigning the first wire segment from the second tier to the first tier. The potential performance is identified based upon the slow performance of the first tier adjusted based upon the routing resource gain. If the evaluation of the current performance and the potential performance indicates that the benefit of the routing resource gain is greater than the performance decrease for the first wire segment, then the first wire segment is reassigned from the second tier to the first tier so that routing resources of the second tier are made available for other wire segments, such as timing relevant segments.

Figure 2:
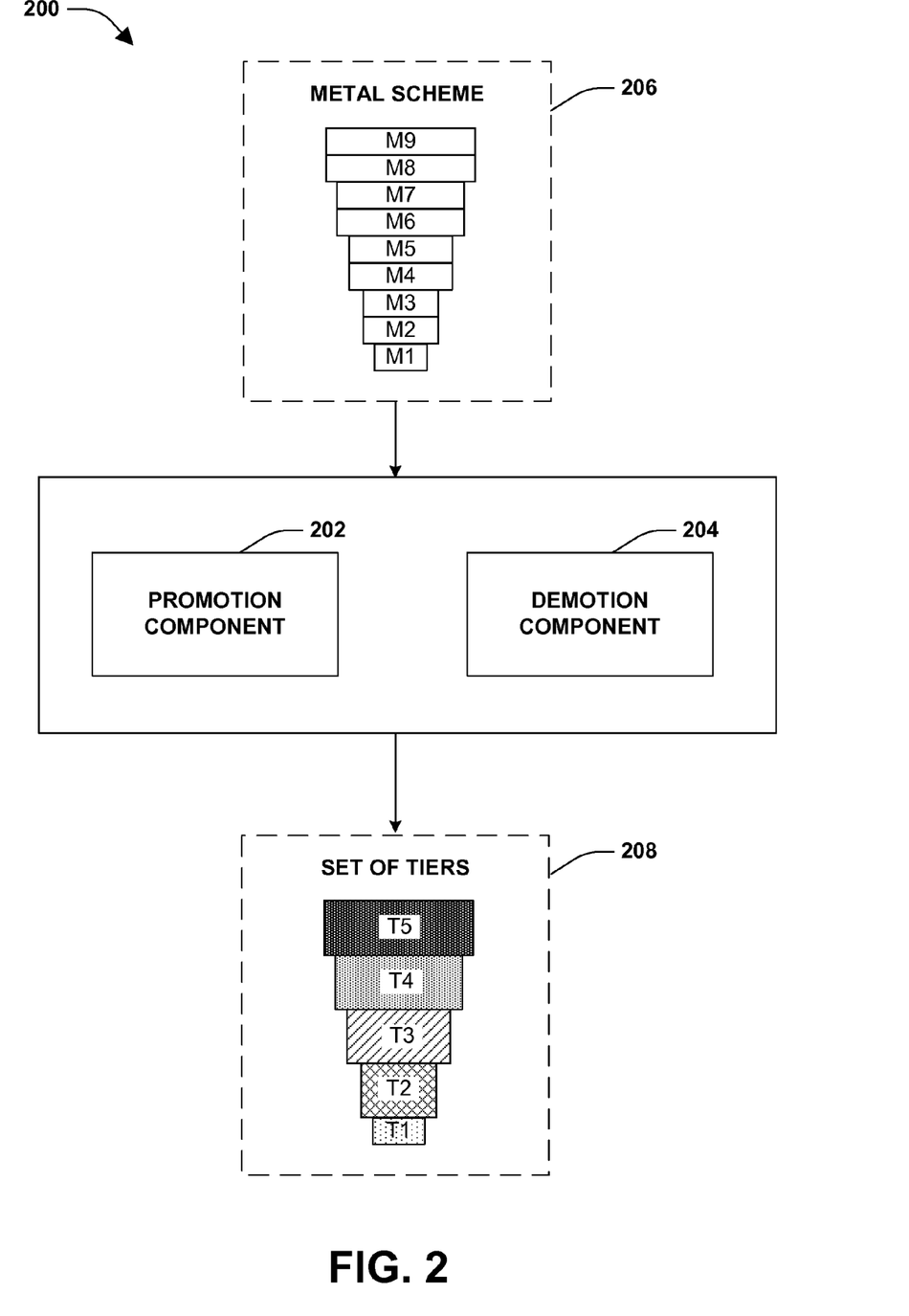
FIG. 2 is an illustration of a system for evaluating a metal scheme for a design layout to group metal layers of the design layout into a set of tiers, in accordance with some embodiments.

FIG. 2 illustrates an example of a system 200 for evaluating a metal scheme 206 for a design layout to group metal layers of the design layout into a set of tiers 208. The system 200 comprises a promotion component 202 and a demotion component 20. The promotion component 202 is configured to reassign, such as promote, wire segments to relatively faster tiers to improve performance of such wire segments. The demotion component 204 is configured to reassign, such as demote, wire segments to relatively slower tiers in order to free up relatively faster routing resources for other wire segments.

In some embodiments, the metal scheme 206 comprises a first metal layer having a first resistance, a second metal layer having a second resistance, a third metal layer having the second resistance, a fourth metal layer having a third resistance, a fifth metal layer having the third resistance, a sixth metal layer having a fourth resistance, a seventh metal layer having the fourth resistance, an eighth metal layer having a fifth resistance, and a ninth metal layer having the fifth resistance. The second resistance is smaller than the first resistance, the third resistance is smaller than the second resistance, the fourth resistance is smaller than the third resistance, and the fifth resistance is smaller than the fourth resistance. As the resistance of the metal layers decreases, performance increases such as speed of a wire segment. In some embodiments, sixth metal layer, the seventh metal layer, the eighth metal layer and the ninth metal layer are relatively faster layers while the first metal layer, the second metal layer, the third metal layer, the fourth metal layer, and the fifth metal layer are relatively slower layers. In some embodiments, the first metal layer is grouped into a first tier based upon the first resistance, the second metal layer and the third metal layer are grouped into a second tier based upon the second resistance, the fourth metal layer and the fifth metal layer are grouped into a third tier based upon the third resistance, the sixth metal layer and the seventh metal layer are grouped into a fourth tier based upon the fourth resistance, and the eight metal layer and the ninth metal layer are grouped into a fifth tier based upon the fifth resistance. The set of tiers 208 is taken into account when reassigning, such as promoting or demoting, wire segments between tiers because the set of tiers 208 is indicative of performance gains or losses associating with promoting or demoting wire segments.

Figure 3A:
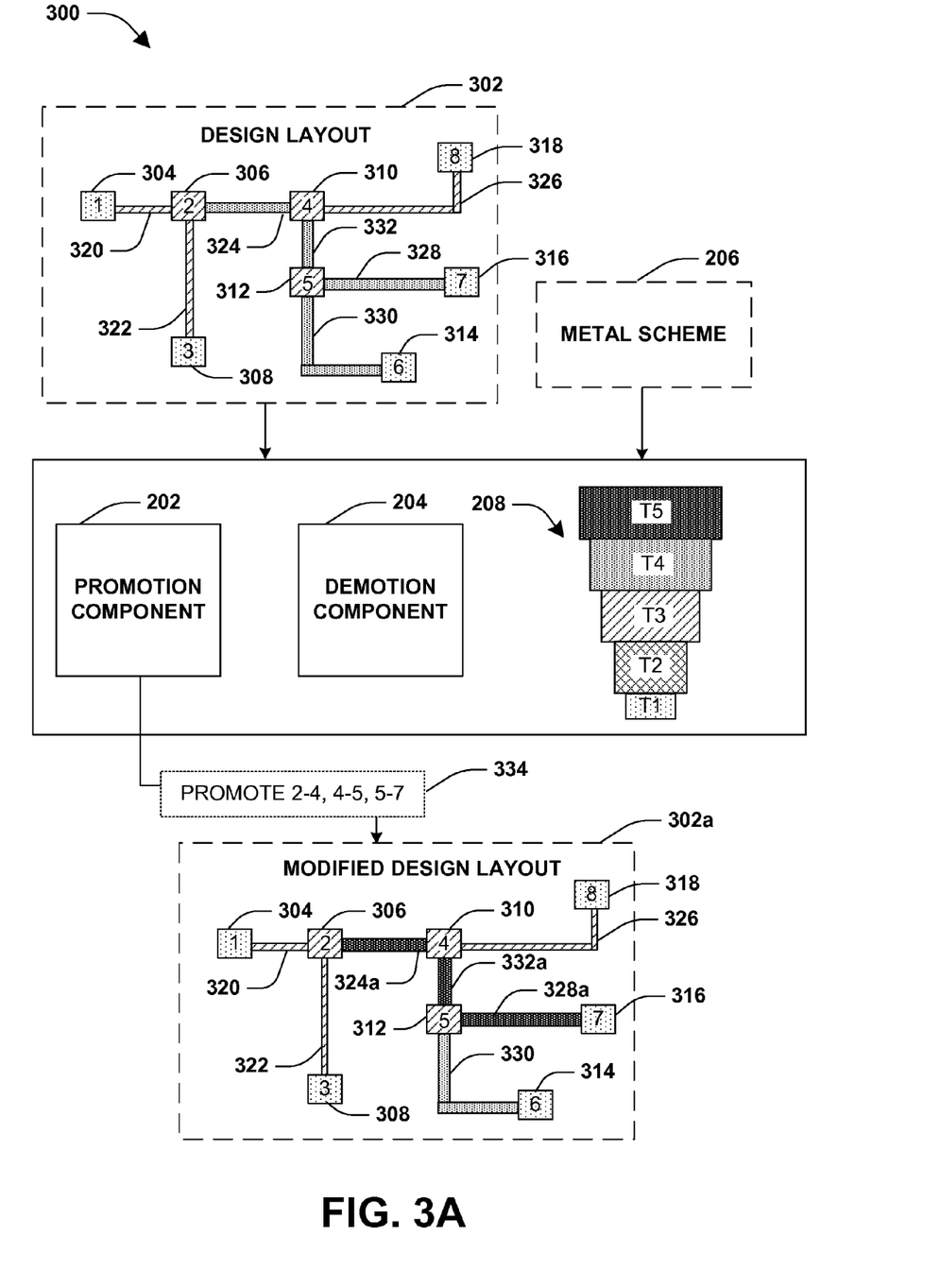
FIG. 3A is an illustration of a system for reassigning, such as promoting, one or more wire segments of a design layout, in accordance with some embodiments.

FIG. 3A illustrates a system 300 for reassigning, such as promoting, one or more wire segments of a design layout 302. The system 300 comprises a promotion component 202 and a demotion component 204 that are configured to evaluate the design layout 302 in light of a metal scheme 206 for the design layout 302. In some embodiments, the metal scheme 206 is evaluated to group metal layers of the design layout 302 into a set of tiers 208, as illustrated in FIG. 2. The set of tiers 208 comprises a first tier, a second tier, a third tier, a fourth tier, and a fifth tier where lower tiers, such as the first tier, provide relatively slower performance and upper tiers, such as the fifth tier, provide relatively faster performance.

The design layout 302 comprises one or more nets, such as a first net. The first net comprises a first component node 304 assigned to the first tier, a second component node 306 assigned to the third tier, a third component node 308 assigned to the first tier, a fourth component node 310 assigned to the third tier, a fifth component node 312 assigned to the third tier, a sixth component node 314 assigned to the first tier, a seventh component node 316 assigned to the first tier, and an eighth component node 318 assigned to the first tier. The component nodes within the first net are connected by wire segments, such as a first wire segment 320 assigned to the third tier, a second wire segment 322 assigned to the third tier, a third wire segment 324 assigned to the fourth tier, a fourth wire segment 326 assigned to the third tier, fifth wire segment 328 assigned to the fourth tier, a sixth wire segment 330 assigned to the fourth tier, and a seventh wire segment 332 assigned to the fourth tier.

The promotion component 202 and the demotion component 204 are configured to evaluate the design layout 302 in light of the metal scheme 206 such as based upon the tier structure 208. In some embodiments, the promotion component 202 determines that a path 1-2-4-5-7, comprising the first component node 304, the first wire segment 320, the second component node 306, the third wire segment 324, the fourth component node 310, the seventh wire segment 332, the fifth component node 312, the fifth wire segment 328 and the seventh component node 316, is a timing relevant path comprising timing relevant segments.

Accordingly, the promotion component 202 evaluates the first wire segment 320, the third wire segment 324, the seventh wire segment 332, and the fifth wire segment 328 to determine whether reassignment, such as promotion 334, of the wire segments would improve performance. The promotion component 202 determines via count penalties associated with reassigning respective wire segments from current tiers to potential tiers. In some embodiments, the promotion component 202 reassigns the third wire segment 324 from the fourth tier to the fifth tier as a promoted third wire segment 324a because promoting the third wire segment 324 from the fourth tier to the fifth tier results in performance improvement notwithstanding a via count penalty corresponding to a timing delay from additional via routing resources used for the reassignment. The promotion component 202 reassigns the seventh wire segment 332 from the fourth tier to the fifth tier as a promoted seventh wire segment 332a because promoting the seventh wire segment 332 from the fourth tier to the fifth tier results in performance improvement notwithstanding a via count penalty corresponding to a timing delay from additional via routing resources used for the reassignment. The promotion component 202 reassigns the fifth wire segment 328 from the fourth tier to the fifth tier as a promoted fifth wire segment 328a because promoting the fifth wire segment 328 from the fourth tier to the fifth tier results in performance improvement notwithstanding a via count penalty corresponding to a timing delay from additional via routing resources used for the reassignment. However, the promotion component 202 does not reassign the first wire segment 320 from the third tier to a potential tier, such as the fifth tier, because such a promotion does not result in performance improvement due to a via count penalty corresponding to a timing delay associated with a number of vias used for routing between tiers for the promotion. In this way, the design layout 302 is modified to create a modified design layout 302a.

Figure 3B:
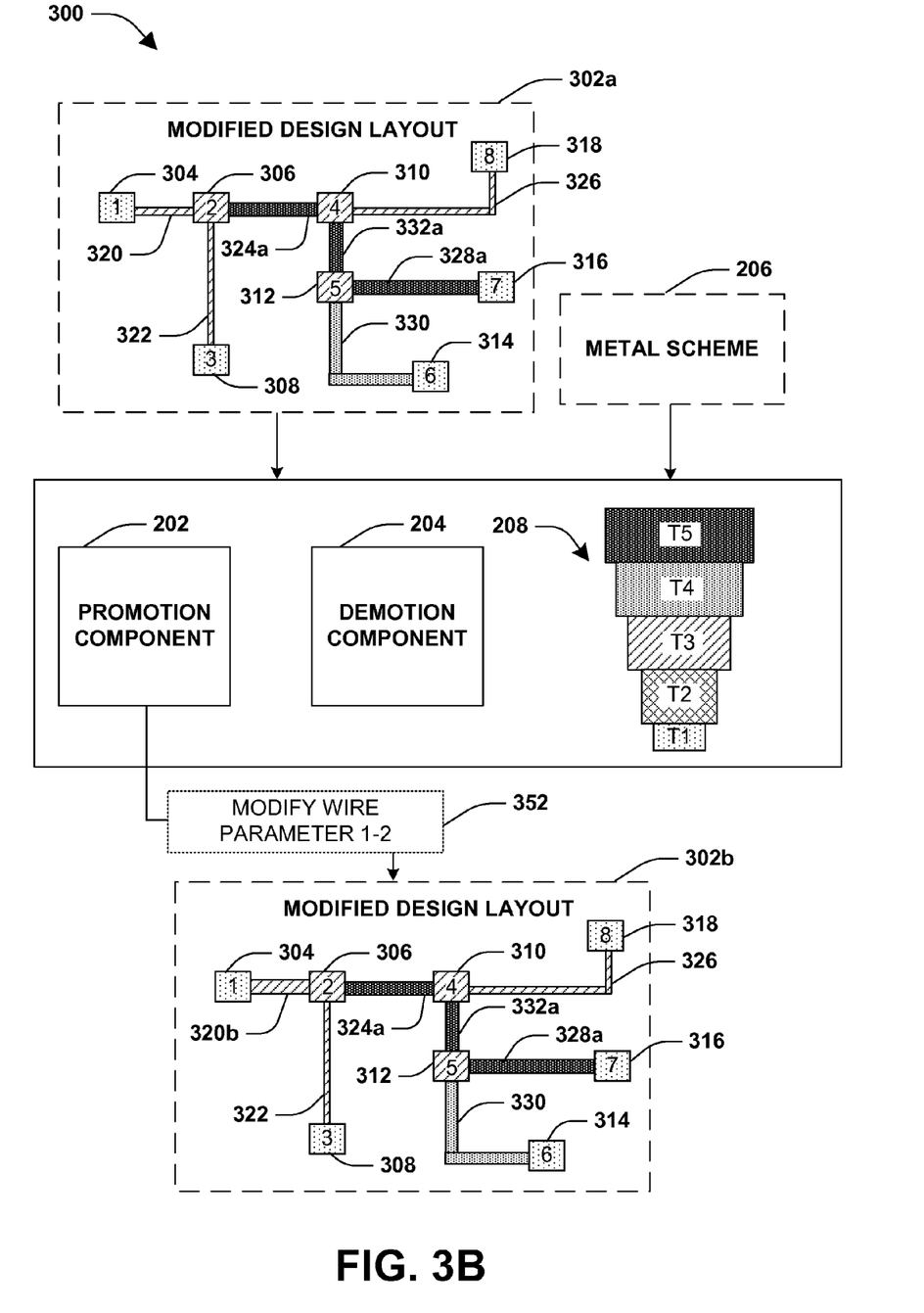
FIG. 3B is an illustration of a system for modifying a wire parameter for a wire segment retained within a current tier, in accordance with some embodiments.

FIG. 3B illustrates the system 300 modifying a wire parameter for a wire segment retained within a current tier. In some embodiments, the promotion component 202 of system 300 modified the design layout 302 by reassigning, such as promoting, the third wire segment 324 to the fifth tier as the promoted third wire segment 324a, the seventh wire segment 332 to the fifth tier as the promoted seventh wire segment 332a, and the fifth wire segment 328 to the fifth tier as the promoted fifth wire segment 328a to create the design layout 302a, as illustrated in FIG. 3A. However, the promotion component 202 did not reassign the first wire segment 320 from the third tier to a potential tier, such as the fourth tier or the fifth tier, because such a promotion would not result in a performance improvement due to a via count penalty corresponding to a timing delay associated with a number of vias used for routing between tiers for the promotion. Accordingly, the promotion component 202 modifies 352 a parameter for the first wire segment 320 to create a modified first wire segment 320b having improved performance, resulting in modified design layout 320b. In some embodiments, the promotion component 202 increases a width of the first wire segment 320, which decreases resistivity to improve performance.

Figure 3C:
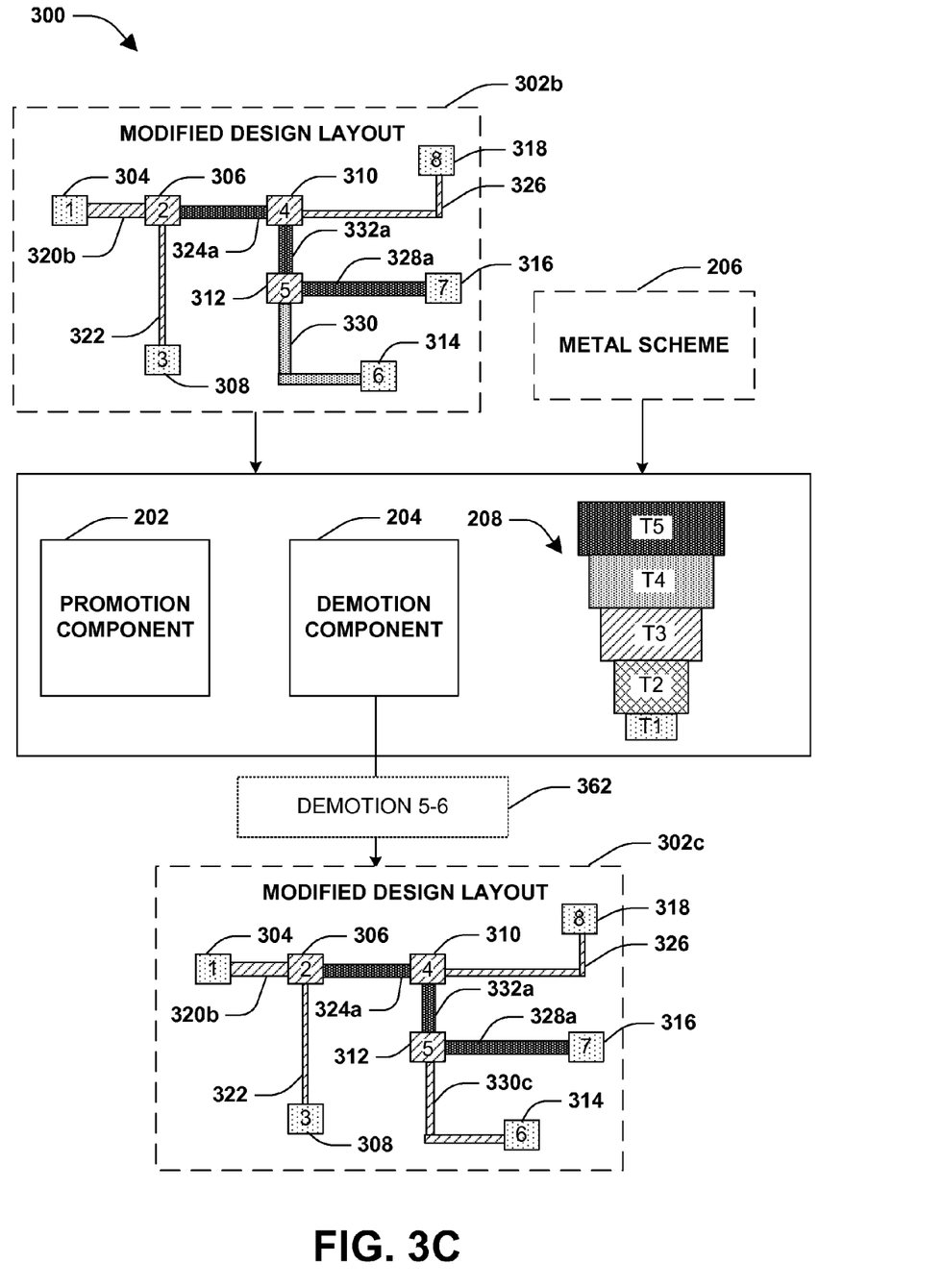
FIG. 3C is an illustration of a system for reassigning, such as demoting, a wire segment from a current tier to a potential tier, in accordance with some embodiments.

FIG. 3C illustrates the system 300 reassigning, such as demoting, a wire segment from a current tier to a potential tier. In some embodiments, the promotion component 202 promoted one or more wire segments of the design layout 302 resulting in the modified design layout 320a, as illustrated in FIG. 3A, and modified a parameter of a wire segment resulting in the modified design layout 320b, as illustrated in FIG. 3B. The demotion component 204 is configured to reassign, such as demote, one or more wire segments so that routing resources of relatively faster tiers are made available, such as for timing relevant segments. In some embodiments, the demotion component 204 evaluates a current performance of the fourth wire segment 326 at the third tier with a potential performance of reassigning the fourth wire segment 326 to a demotion tier, such as the second tier or the first tier. Because a routing resource gain, corresponding routing resources on the third tier that are freed up by reassign the fourth wire segment 326 from the third tier, does not compensate for a decrease in performance from reassigning the fourth wire segment 326 to the demotion tier, the demotion component 204 does not reassign the fourth wire segment 326.

In some embodiments, the demotion component 204 evaluates a current performance of the sixth wire segment 330 at the fourth tier with a potential performance of reassigning the sixth wire segment 330 to a demotion tier, such as the third tier. The demotion components 204 determines that a routing resource gain, corresponding to routing resources on the fourth tier that are freed up by reassigning the sixth wire segment 330 from the fourth tier, compensates for a decrease in performance from reassigning the sixth wire segment 330 from the fourth tier to the third tier.

According, the demotion component 204 reassigns, such as demotes 362, the sixth wire segment 330 from the fourth tier to the third tier as a demoted sixth wire segment 330c, resulting in a modified design layout 302c. In this way, routing resources on the fourth tier are freed up for timing relevant segments.

Figure 4A:
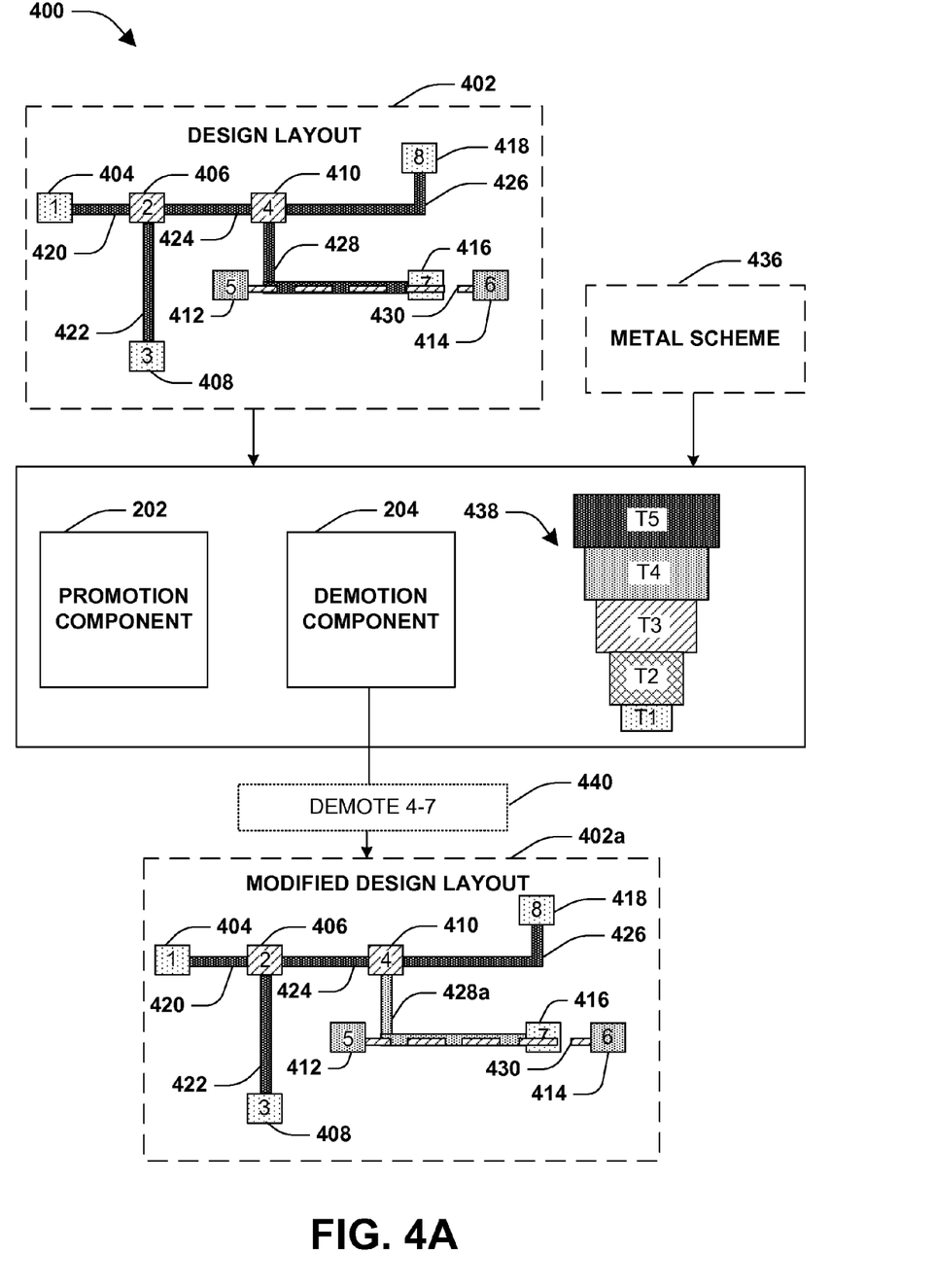
FIG. 4A is an illustration of a system for evaluating multiple nets of a design layout, in accordance with some embodiments.

FIG. 4A illustrates a system 400 for evaluating multiple nets of a design layout 402. The system 400 comprises a promotion component 202 and a demotion component 204 that are configured to evaluate the design layout 402 in light of a metal scheme 436 for the design layout 402. In some embodiments, the metal scheme 206 is evaluated to group metal layers of the design layout 402 into a set of tiers 438 based upon resistivity similarity between metal layers. The set of tiers 438 comprises a first tier, a second tier, a third tier, a fourth tier, and a fifth tier where lower tiers, such as the first tier, provide relatively slower performance and upper tiers, such as the fifth tier, provide relatively faster performance.

The design layout 402 comprises one or more nets, such as a first net and a second net. The first net comprises a first component node 404 assigned to the first tier, a second component node 406 assigned to the third tier, a third component node 408 assigned to the first tier, a fourth component node 410 assigned to the third tier, a seventh component node 416 assigned to the first tier, and an eighth component node 418 assigned to the first tier. The component nodes within the first net are connected by wire segments, such as a first wire segment 420 assigned to the fifth tier, a second wire segment 422 assigned to the fifth tier, a third wire segment 424 assigned to the fifth tier, a fourth wire segment 426 assigned to the fifth tier, and a fifth wire segment 428 assigned to the fifth tier. The second net comprises a fifth component node 412 assigned to the fourth tier and a sixth component node 414 assigned to the fourth tier. The component nodes within the second net are connected by wire segments, such as a sixth wire segment 430 assigned to the third tier. In some embodiments, the first net and the second net are not to be electrically connected, and thus the fifth wire segment 428 and the sixth wire segment 430 are to be assigned to different tiers because of overlap between the fifth wire segment 428 and the sixth wire segment 430.

In some embodiments, the fifth wire segment 428 is identified as a non-timing relevant segment and the sixth wire segment 430 is identified as a timing relevant segment. Accordingly, the demotion component 204 evaluates a current performance of the fifth wire segment 428 at the fifth tier with a potential performance of reassigning, such as demoting, the fifth wire segment 428 to a demotion tier, such as the fourth tier. The demotion component 204 determines that a routing resource gain, corresponding to routing resources on the fifth tier that are freed up by reassigning the fifth wire segment 428 from the fourth tier, compensates for a decrease in performance from reassigning the fifth wire segment 428 from the fifth tier to the fourth tier. According, the demotion component 204 reassigns, such as demotes 440, the fifth wire segment 428 from the fifth tier to the fourth tier as a demoted fifth wire segment 428a, resulting in a modified design layout 402a. In this way, routing resources on the fifth tier are freed up for timing relevant segments, such as the sixth wire segment 430.

Figure 4B:
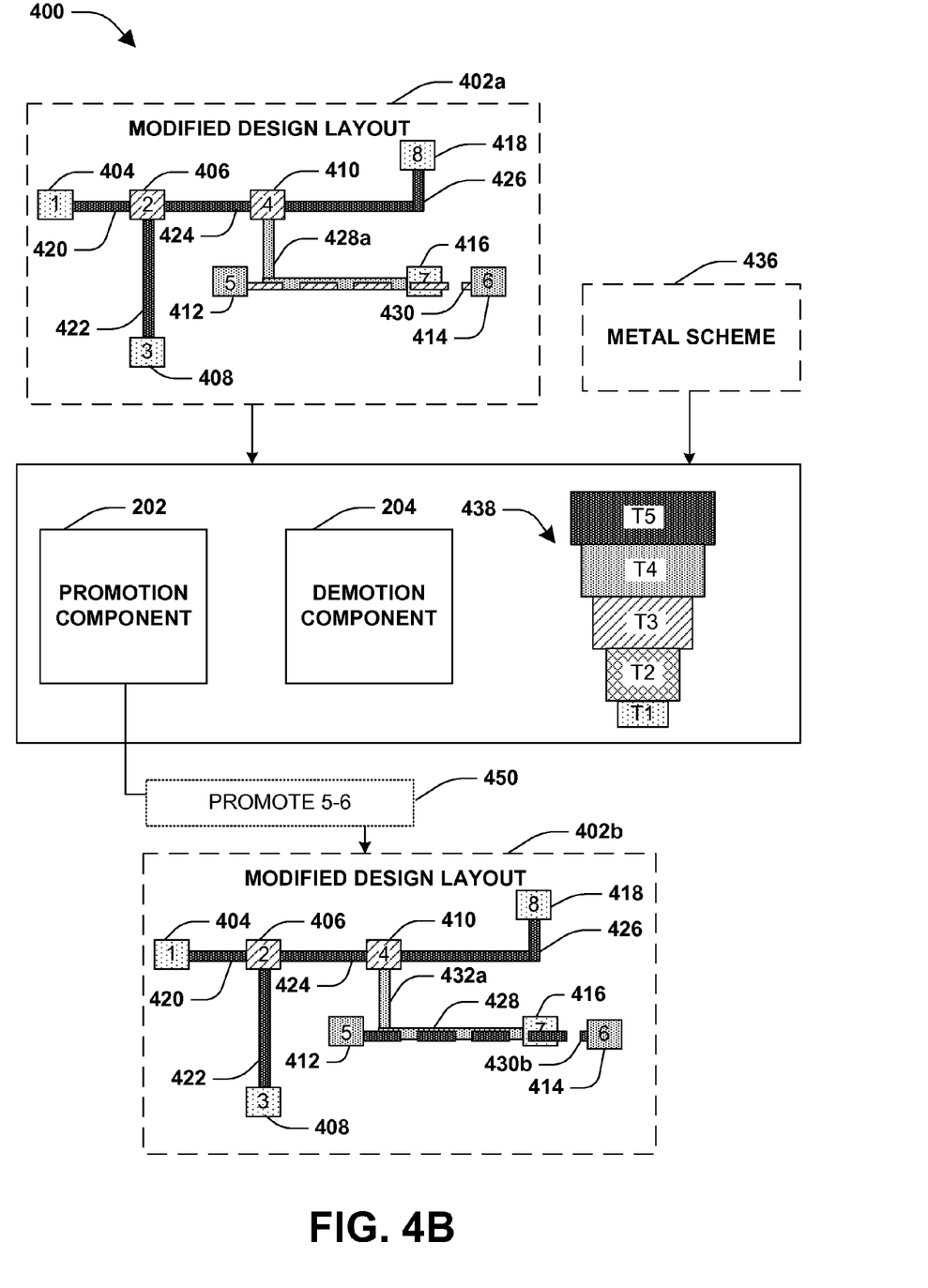
FIG. 4B is an illustration of a system for reassigning, such as promoting, a wire segment of a modified design layout, in accordance with some embodiments.

FIG. 4B illustrates the system 400 reassigning, such as promoting 450, the sixth wire segment 430 of the modified design layout 402a. In some embodiments, the demotion component 204 of the system 400 reassigned, such as demoted, the fifth wire segment 428 from the fifth tier to the fourth tier to free up routing resource on the fifth tier for timing relevant segments, such as the sixth wire segment 430. Accordingly, the promotion component 202 of the system 400 evaluates a current performance of the sixth wire segment 430 on the third tier with a potential performance of the sixth wire segment 430 on a potential tier, such as the fifth tier. The promotion component 202 determines a via count penalty associated with reassigning the sixth wire segment 430 from the third tier to the fifth tier. The via count penalty corresponds to a timing delay associated with a number of vias used to reassign the sixth wire segment 430 from the third tier to the fifth tier. In some embodiments, the promotion component 202 reassigns the sixth wire segment 430 to the fifth tier as a promoted sixth wire segment 430b because promoting the sixth wire segment 430 from the third tier to the fifth tier results in performance improvement notwithstanding the via count penalty. In this way, the modified design layout 402a is modified to create a modified design layout 402b.

Figure 5:
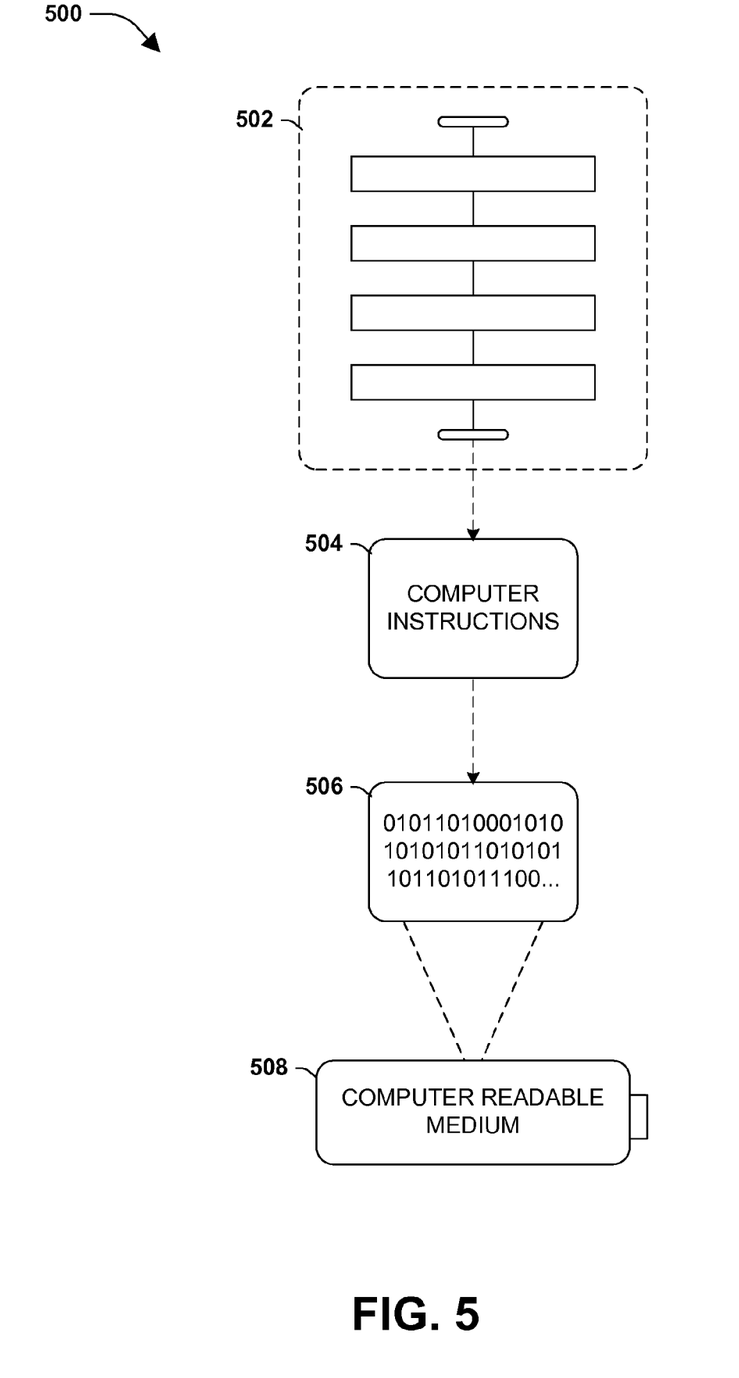
FIG. 5 is an illustration of an example computer-readable medium wherein processor-executable instructions configured to embody one or more of the provisions set forth herein may be comprised, in accordance with some embodiments.

Still another embodiment involves a computer-readable medium comprising processor-executable instructions configured to implement one or more of the techniques presented herein. An exemplary computer-readable medium is illustrated in FIG. 5, wherein the implementation 500 comprises a computer-readable medium 508 (e.g., a CD-R, DVD-R, flash drive, a platter of a hard disk drive, etc.), on which is encoded computer-readable data 506. This computer-readable data 506 in turn comprises a set of computer instructions 504 configured to operate according to one or more of the principles set forth herein. In one such embodiment 500, the processor-executable computer instructions 504 may be configured to perform a method 502, such as at least some of the exemplary method 100 of FIG. 1, for example. In another such embodiment, the processor-executable instructions 512 may be configured to implement a system, such as at least some of the exemplary system 200 of FIG. 2, at least some of the exemplary system 300 of FIG. 3A-3C, and/or at least some of the exemplary system 400 of FIG. 4A-4B, for example. Many such computer-readable media may be devised by those of ordinary skill in the art that are configured to operate in accordance with the techniques presented herein.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
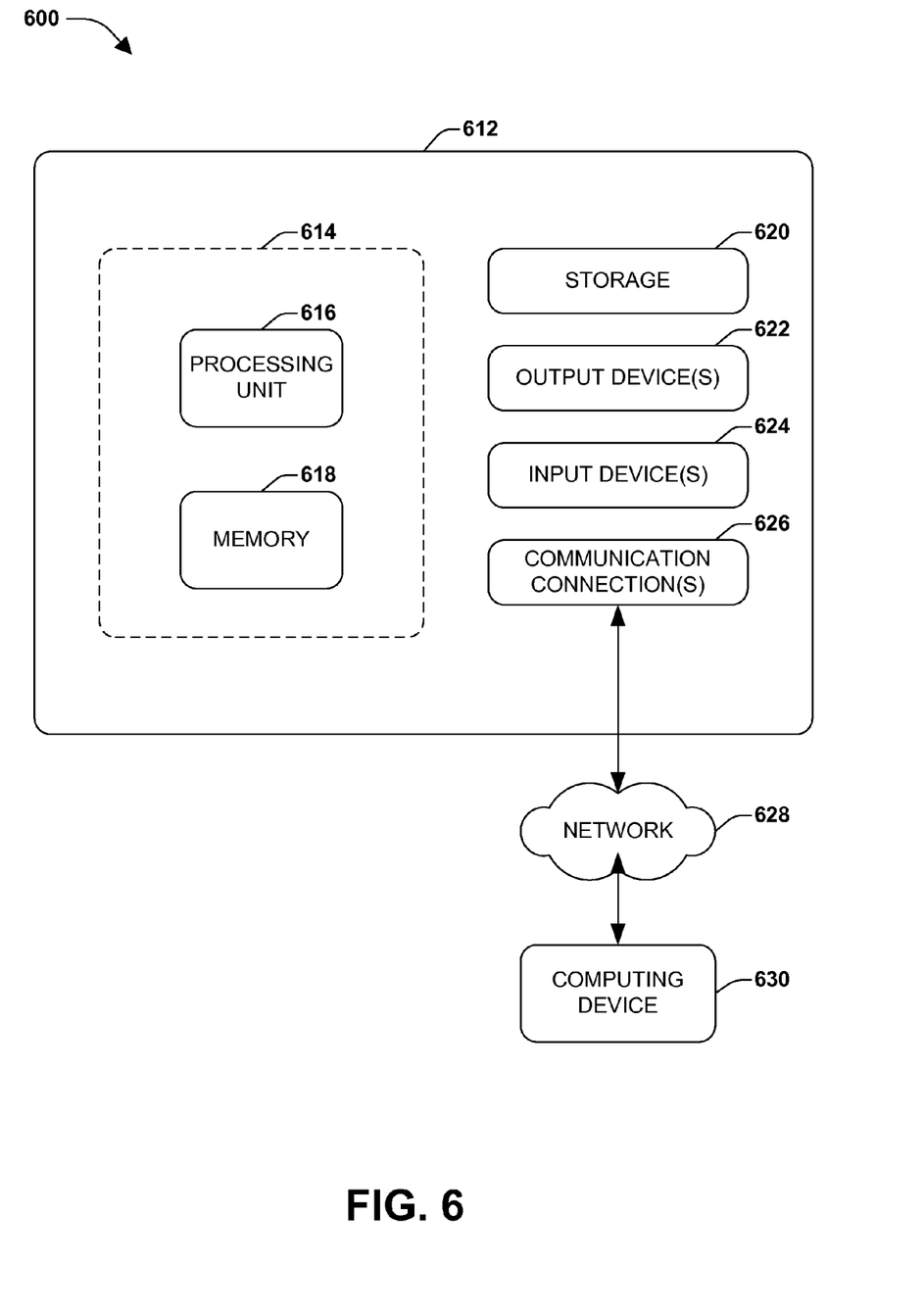
FIG. 6 illustrates an example computing environment wherein one or more of the provisions set forth herein may be implemented, in accordance with some embodiments.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 600 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example) or some combination of the two. This configuration is illustrated in FIG. 6 by dashed line 614.

In other embodiments, device 612 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In some embodiments, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In some embodiments, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via a network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

According to an aspect of the instant disclosure, a method for tier based layer modification for a design layout is provided. The method comprises evaluating a metal scheme for the design layout to group metal layers of the design layout into a set of tiers. A first net within the design layout is identified. The first net comprises a first wire segment. A current performance for the first wire segment is determined based upon a current tier, of the set of tiers, to which the first wire segment is assigned. A potential performance for the first wire segment is determined based upon a potential tier, of the set of tiers, to which the first wire segment could be reassigned. The current performance and the potential performance are evaluated to either retain the assignment of the first wire segment to the current tier or reassign the first segment to the potential tier.

According to an aspect of the instant disclosure, a system for tier based layer promotion for a design layout is provided. The system comprises a promotion component. The promotion component is configured to evaluate a metal scheme for the design layout to group metal layers of the design layout into a set of tiers. The promotion component is configured to identify a first net within the design layout. The first net comprises a first wire segment. The promotion component is configured to determine a current performance for the first wire segment based upon a current tier to which the first wire segment is assigned. The promotion component is configured to determine a potential performance for the first wire segment based upon a promotion tier to which the first wire segment could be reassigned. The promotion component is configured to evaluate the current performance and the potential performance to either retain the assignment of the first wire segment to the current tier or to reassign the first wire segment to the promotion tier.

According to an aspect of the instant disclosure, a system for tier based layer demotion for a design layout is provided. The system comprises a demotion component. The demotion component is configured to evaluate a metal scheme for the design layout to group metal layers of the design layout into a set of tiers. The demotion component is configured to identify a first net within the design layout. The first net comprises a first wire segment. The demotion component is configured to determine a current performance for the first wire segment based upon a current tier to which the first wire segment is assigned. The demotion component is configured to determine a potential performance for the first wire segment based upon a demotion tier to which the first wire segment could be reassigned. The demotion component is configured to evaluate the current performance and the potential performance to either retain the assignment of the first wire segment to the current tier or to reassign the first wire segment to the demotion tier.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for tier based layer modification for a design layout, comprising:
    evaluating a metal scheme for a design layout to group metal layers of the design layout into a set of tiers based upon a resistivity associated with the respective metal layers;
    identifying a first net within the design layout, the first net comprising a first wire segment;
    determining a current performance for the first wire segment based upon a current tier, of the set of tiers, to which the first wire segment is assigned;
    determining a potential performance for the first wire segment based upon a potential tier, of the set of tiers, to which the first wire segment could be reassigned;
    evaluating the current performance and the potential performance to either retain an assignment of the first wire segment to the current tier or reassign the first wire segment to the potential tier; and
    forming the first wire segment within an integrated circuit according to the design layout, wherein:
        the first wire segment is formed within a metal layer of the current tier when the assignment of the first wire segment to the current tier is retained; and
        the first wire segment is formed within a metal layer of the potential tier when the first wire segment is reassigned to the potential tier.

2. The method of claim 1, the evaluating a metal scheme comprising:
    grouping a first metal layer and a second metal layer into a tier based upon the first metal layer having a first resistance property corresponding to a second resistance property of the second metal layer.

3. The method of claim 1, comprising:
  determining that the first wire segment comprises a timing relevant segment; and
  identifying the potential tier as a promotion tier with respect to the current tier based upon the timing relevant segment.

4. The method of claim 3, the promotion tier having a first resistance property that is smaller than a second resistance property of the current tier.

5. The method of claim 1, comprising:
  determining that the first wire segment comprises a non-timing relevant segment; and
  identifying the potential tier as a demotion tier with respect to the current tier based upon the non-timing relevant segment.

6. The method of claim 5, the demotion tier having a first resistance property that is larger than a second resistance property of the current tier.

7. The method of claim 1, comprising:
  responsive to retaining the assignment of the first wire segment to the current tier, modifying a size parameter of the first wire segment.

8. The method of claim 1, comprising:
  responsive to retaining the assignment of the first wire segment to the current tier, inserting a buffer into the current tier with respect to the first wire segment.

9. The method of claim 1, the determining a potential performance comprising:
  identifying a via count penalty associated with reassigning the first wire segment to the potential tier; and
  specifying the potential performance based upon the via count penalty.

10. The method of claim 1, the determining a potential performance comprising:
  identifying a routing resource gain associated with reassigning the first wire segment to the potential tier; and
  specifying the potential performance based upon the routing resource gain.

11. A system for tier based layer promotion for a design layout, comprising:
  at least one of a promotion component or a demotion component configured to:
    evaluate a metal scheme for a design layout to group metal layers of the design layout into a set of tiers based upon a resistivity associated with the respective metal layers;
    identify a first net within the design layout, the first net comprising a first wire segment;
    determine a current performance for the first wire segment based upon a current tier to which the first wire segment is assigned;
    determine a potential performance for the first wire segment based upon a promotion tier to which the first wire segment could be reassigned; and
    evaluate the current performance and the potential performance to either retain an assignment of the first wire segment to the current tier or reassign the first wire segment to the promotion tier, wherein the first wire segment is formed within an integrated circuit according to the design layout,
      the first wire segment formed within a metal layer of the current tier when the assignment of the first wire segment to the current tier is retained; and
      the first wire segment formed within a metal layer of the promotion tier when the first wire segment is reassigned to the promotion tier.

12. The system of claim 11, the first wire segment comprising a timing relevant segment.

13. The system of claim 11, the promotion tier having a first resistance property that is smaller than a second resistance property of the current tier.

14. The system of claim 11, the promotion component configured to:
  identify a via count penalty associated with reassigning the first wire segment to the promotion tier; and
  specify the potential performance based upon the via count penalty.

15. The system of claim 11, the promotion component configured to:
  responsive to retaining the assignment of the first wire segment to the current tier, at least one of modify a size parameter of the first wire segment or insert a buffer into the current tier with respect to the first wire segment.

16. A non-transitory computer readable medium comprising instructions that when executed perform operations, comprising:
  evaluating a metal scheme for a design layout to group metal layers of the design layout into a set of tiers;
  identifying a first net within the design layout, the first net comprising a first wire segment;
  determining a current performance for the first wire segment based upon a current tier to which the first wire segment is assigned;
  determining a potential performance for the first wire segment based upon a demotion tier to which the first wire segment could be reassigned, the determining comprising:
    identifying a routing resource gain associated with reassigning the first wire segment to the demotion tier; and
    specifying the potential performance based upon the routing resource gain;
  evaluating the current performance and the potential performance to either retain an assignment of the first wire segment to the current tier or reassign the first wire segment to the demotion tier; and
  forming the first wire segment within an integrated circuit according to the design layout, wherein:
    the first wire segment is formed within a metal layer of the current tier when the assignment of the first wire segment to the current tier is retained; and
    the first wire segment is formed within a metal layer of the demotion tier when the first wire segment is reassigned to the demotion tier.

17. The non-transitory computer readable medium of claim 16, the first wire segment comprising a non-timing relevant segment.

18. The non-transitory computer readable medium of claim 16, the demotion tier having a first resistance property that is larger than a second resistance property of the current tier.

19. The non-transitory computer readable medium of claim 16, the evaluating a metal scheme for a design layout comprising:
  grouping metal layers of the design layout into the set of tiers based upon a resistivity associated with the respective metal layers.

20. The non-transitory computer readable medium of claim 16, the operations comprising:
  responsive to retaining the assignment of the first wire segment to the current tier, at least one of modifying a size parameter of the first wire segment or inserting a buffer into the current tier with respect to the first wire segment.

* * * * *

UNITED STATES PATENT AND TRADEMARK OFFICE
CERTIFICATE OF CORRECTION

PATENT NO. : 9,436,793 B2  
APPLICATION NO. : 14/166974  
DATED : September 6, 2016  
INVENTOR(S) : Yen-Hung Lin et al.

Page 1 of 1

It is certified that error appears in the above-identified patent and that said Letters Patent is hereby corrected as shown below:

On the Title Page

In item (72) titled Inventors: please delete "Boashan" and insert therefor --Baoshan--

Signed and Sealed this  
Fourth Day of April, 2017

Michelle K. Lee  
*Director of the United States Patent and Trademark Office*